April 10, 1934.
T. HOBLER
1,954,317
PROCESS FOR THE UTILIZATION OF HEAT IN AMMONIA
OXIDATION-NITRIC ACID PRESSURE PROCESSES
Filed July 22, 1933
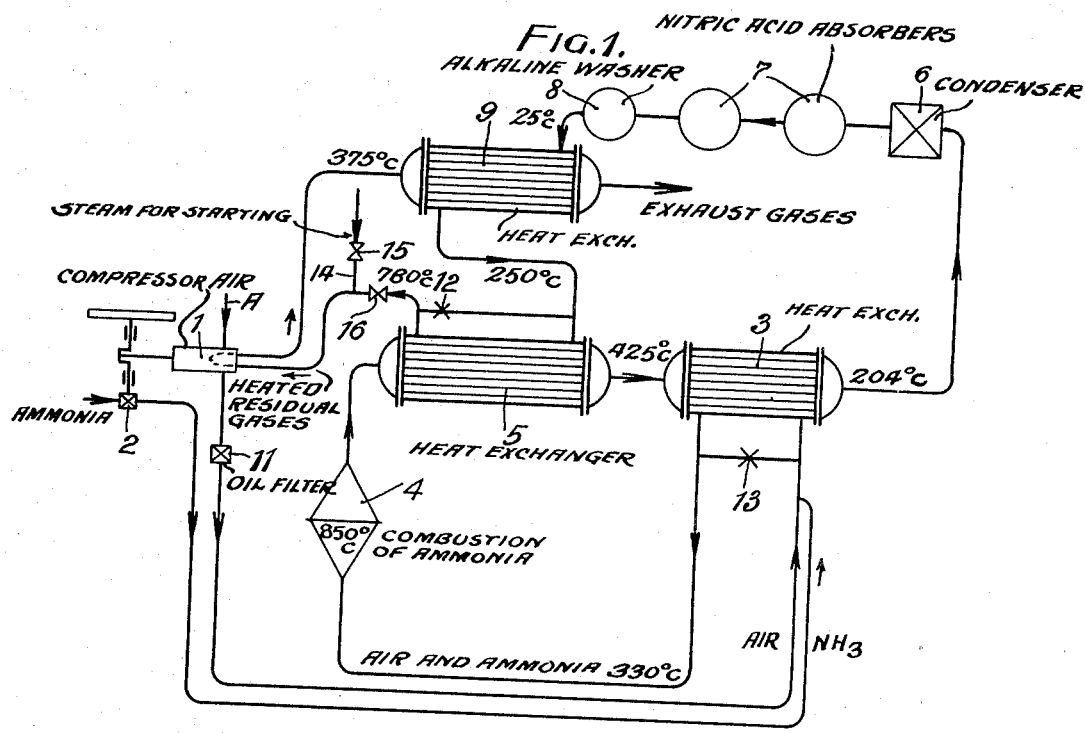
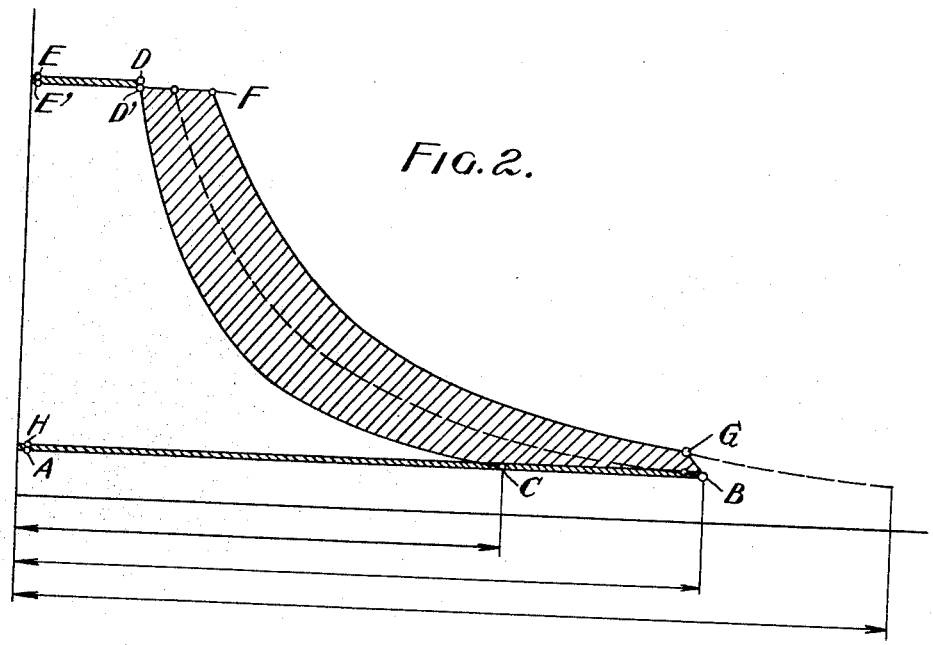

Patented Apr. 10, 1934

1,954,317

UNITED STATES PATENT OFFICE 1,954,317

PROCESS FOR THE UTILIZATION OF HEAT IN AMMONIA OXIDATION—NITRIC ACID PRESSURE PROCESSES

Tadeusz Hobler, Paris, France, assignor to firm Hydro Nitro S. A., Geneva, Switzerland, a corporation of Switzerland Application July 22, 1933. Serial No. 681,690
In Germany January 22, 1932

5 Claims. (Cl. 23—162)

In manufacturing nitric acid by the oxidation of ammonia with air and absorbing the nitric oxides produced, and in other reactions of like nature, it is advantageous to carry on the oxidation under pressure instead of at atmospheric or low pressures. Among other advantages, it enables nitric acid of considerably greater concentration to be obtained and occasions great savings in requirement of space and material. These advantages are, however, opposed by the great consumption of energy for the work of compression. It has indeed been attempted to recover the energy of the residual gases; this has, however, only been partially successful hitherto, as the work of compression could hardly be recovered to as much as from 40 to 60%. In this connection it is to be taken into consideration that the volume of the residual gases is reduced by the consumption of atmospheric oxygen by the ammonia to form nitrogen oxides and water and by the absorption of the nitrogen oxides in water in the absorbers. Moreover the efficiency of the expansion engine and the compressor is naturally not 100%.

The portion of the heat energy of the hot nitrogen oxides, which has not been used for the preheating of the mixture of ammonia and air, has already been employed for preheating the residual gases passed to expansion. In this case, however, the residual gases were preheated only to such an extent that their energy was not sufficient to cover the work of compression.

It has now been found that the residual gases can be preheated by the heat existing in the system to a temperature that is so high that, on their expansion, they recover the work of compression completely or almost completely within the limits of pressure, five to eight atmospheres, now usable in practice. According to the invention, the residual gases that are to be supplied to the expansion engine are preheated to such an extent that the exhaust expansion gases of the expansion engine are sufficiently hot to preheat in the first stage the compressed gases coming from the absorption whereupon the compressed gases are then, in the second stage, heated up to the desired degree in heat interchange with the gases of combustion or products of oxidation or reaction. The residual gases that are to be relieved of pressure are thus heated entirely by the heat present in the system to a temperature whose magnitude is determined by the particular pressure chosen, the work of compression to be performed, and the losses occurring, by first preheating these residual gases by means of the expansion gases and then bringing them to the desired temperature before entering the expansion engine by means of the heat in the nitrogen oxides gases. In this case the heat used for preheating the residual gases passing to the expansion engine with heat taken from the exhaust gases from the expansion engine is used over and over again whilst the heat that is added to the thus preheated gases going to the expansion engine to attain the desired high temperature is taken from the hot nitrogen oxides gases. The temperature of the hot nitrogen oxides gases is in this case reduced only to such an extent that it is still sufficient for the preheating of the mixture of ammonia and air to the optimum temperature.

It has been known to utilize the heat content of the exhaust gases of expansion of hot gases in expansion engines for the purpose of preheating the expansion gases. It has further been proposed in the case of the pressure absorption of any desired gases to heat up the unabsorbed residual gases before expansion by supplying heat from outside in order to compensate in this way to a large extent for the compression energy that is to be consumed.

In comparison with these known methods of working, the process according to my invention contains the novel differentiating feature that the unabsorbed residual gases are heated to a considerably greater extent than has hitherto been usual. This method of working was not obvious because on the one hand it could not be directly assumed that the waste heat of the exhaust gases would be useful for such a great heating of the compressed gases coming from the absorption and because on the other hand difficulties were to be expected in the introduction of such highly heated compressed gases into the expansion engine particularly with regard to the constructional material and the lubricant. These difficulties are removed in the present process in the manner now to be described.

In Fig. 1 there is diagrammatically represented an example of arrangement of an apparatus suitable for carrying out the process.

The combustion air is compressed to the necessary working pressure of, for example, 8 atmospheres in a piston engine 1. This engine can be constructed, for example, in such a manner that the compression of the air and the expansion of the residual gases take place in the same cylinder. The compressed combustion air is carefully freed from oil in the filter 11 and passed to the heat exchanger 3; on the way liquid ammonia is injected into the air pipe by a suitable pump 2. The pump 2 is coupled with the piston engine 1, so that a constant proportion of ammonia and air is ensured. The mixture of ammonia and air that has been compressed to 8 atmospheres and has been preheated to about 330° C. after passing through the heat exchanger 3, enters the oxidation element 4. The gases that are mixed with the nitrogen oxides formed here and have been heated to about 850° C. by the heat of reaction, pass through the heat exchanger 5 and, after they have here given up a portion of their heat, arrive with a temperature of about 425° C. at the heat exchanger 3 which they leave with a temperature of 204° C. after preheating the mixture of ammonia and air. The nitrogen oxides are finally cooled down in the condenser 6, and the condensate is separated. The uncondensed nitrogen oxides are oxidized and absorbed in water in the absorbers 7 to form nitric acid. Any nitrogen oxides left in the gases are absorbed in the alkaline washer 8, and the residual gases, free from acids or oxides, issue therefrom at a temperature of about 25° C. They are then preheated to about 250° C. in the heat exchanger 9, and then heated to about 780° C. in the heat exchanger 5 and thereupon led to the expansion engine 1. The exhaust gases issuing at about 373° C. from the expansion engine are carried away after passing through the heat exchanger 9. The valves 12 and 13 serve for regulating the temperature of the residual gases and of the mixture of ammonia and air respectively. The pipe 14 and the valve 15 serve for passing in the superheated steam which serves for setting the piston engine into operation. The check valve 16 prevents the striking back of the steam.

A working pressure of 8 atmospheres is the basis for the approximate temperatures given by way of example in connection with this working diagram. The preheating temperature for the mixture of ammonia and air the temperature of the nitrogen oxides leaving the combustion element 4 and also the temperature of the relieved residual gases leaving the expansion engine may be kept at about the orders of magnitude given even with other working pressures; the temperature of the gases that are to be passed into the expansion engine, which temperature is to be adjusted to the particular working pressure, can be correspondingly regulated. The other temperatures indicated shift themselves in accordance with the pressure chosen and the desired temperature before the expansion engine is adjusted to the particular pressure; obviously, however, another temperature may be made the basis for the relieved gases. When used for higher pressures than 8 atmospheres the possible recovery of energy will not be as complete but, in any case, greater than if my invention were not used. The power of the heat exchangers is adjusted to the particular fixed working conditions. The number of heat exchangers as well as the passage of the gases through them may be differently combined.

According to the above example, the fall in temperature of the residual gases $$T_1 - T_2 = 780° - 373° = 407°$$

$T_1$ being the temperature of the gases entering the engine 1 and $T_2$ being the temperature of the exhaust gases from the engine.

If under otherwise similar conditions the gases leaving the alkaline washer were led directly into heat exchanger 5 without the use of proposed heat exchanger 9, then the temperature $T_1$ would be only 780° C.−250° C.+25° C.=555° C. (250° C. being the preheating that would have taken place in exchanger 9 had it been used). Then when the gas is expanded from 8 atmospheres and 555° C. to 1 atmosphere, the exhaust temperature would be 232° C. and the temperature drop in the expansion machine would be only 555° C.−232° C.=323° C. instead of 407° C. as in the preceding example. Under these circumstances the available heat would not be sufficient in the expansion machine to cover the work of compression. (Theoretical adiabatic energy available being $AL = C_v(T_1 - T_2)$).

Owing to the high initial temperatures of the residual gases which form the basis of the present process, many difficulties occur particularly with regard to finding a constructional material which is sufficiently heat-resisting and at the same time has all the properties that are necessary in engine construction. Similar difficulties are encountered in the selection of the lubricant.

In the case of smaller working pressures and, consequently, smaller initial temperatures, the difficulties mentioned can be removed for example by the employment of a reaction gas turbine the fall in temperature of the gases that is dependent upon the fall in pressure being already effected on issuing from the nozzles. A sufficiently heat-resisting material for the stationary nozzles can be found without difficulty. All the remaining portions of the turbine are, however, exposed merely to the temperature of the expanded gases, so that the difficulties indicated can be overcome.

These difficulties are, however, also removed by the application of a piston engine in such a manner that the expansion of the residual gases and the compression of the air mixture for the combustion are carried out in the same cylinder and that each expansion period of the residual gases alternates with a compression period of the combustion air, with the result that a mean temperature that is sufficiently low both for the constructional material as well as for the lubrication is ensured in the cylinder.

Such a method of working can readily be carried out in, for example, a four-stroke cycle. The theoretical diagram of Fig. 2 represents such an operation.

In the first stroke, from the point A to the point B, the combustion air with a temperature of about 25° C. is drawn in; in the second stroke, from the point B to the point C, a portion of the volume of air that has been drawn in is ejected and the compression of the combustion air is carried out in the further portion of the stroke; finally, between the points D and E the compressed air is pushed into the pressure piping. In the first section of the third stroke at the point E the flowing in of the residual gases begin. The filling is effected up to the point F and the expansion is effected from F to G; the flowing forward takes place from the point G to the point B and the discharge takes place from B to H.

As may be seen, the first and second strokes correspond except for the path B—C to a compression diagram and the third and fourth strokes correspond to a normal diagram of an expansion engine.

The diagram described is purely theoretical; in practice the working field of the diagram is smaller. The shaded area D, F, G, B, C represents the positive work and the area E, E', D, D' and the surface H, A, B represent the negative work; the difference illustrates the excess of work for covering the losses.

It is further pointed out that in the residual gases issuing from the alkaline washing only very small traces of NO₂ are contained and that even these are dissociated at the high temperature employed so that the gases, which contain merely traces of NO, do not cause any corrosion.

The method of working described can also be employed in the case in which the combustion of the mixture of ammonia and air is carried out without pressure and only the absorption is carried out under pressure. In this case, the compression of the nitro gases can be carried out by a turbo-compressor which has already been proposed for this purpose and for which the motive power is supplied by a reaction gas turbine that is driven with the residual gases in the manner described.

What I claim as my invention and desire to secure by Letters Patent of the United States of America is:—

1. In the production of nitric acid under pressure by the oxidation of ammonia by air under pressure, absorption of the resulting oxides, and utilizing the residual gases in an expansion engine to compress air for said combustion, the process which comprises heating said residual gases from said absorption first by abstraction of heat from the exhaust gases from said expansion engine, then by abstraction of heat from the products of said oxidation.

2. In the production of nitric acid under pressure by the oxidation of ammonia by air under pressure, absorption of the resulting oxides, and utilizing the residual gases in an expansion engine to compress air for said combustion, the process which comprises heating said residual gases from said absorption first by abstraction of heat from the exhaust gases from said expansion engine, then by abstraction of heat from the products of said oxidation, then compressing air for said oxidation by expanding said heated residual gases in the expansion engine.

3. In the production of nitric acid under pressure by the oxidation of ammonia by air under pressure, absorption of the resulting oxides, and utilizing the residual gases in an expansion engine to compress air for said combustion, the process which comprises heating said residual gases from said absorption first by abstraction of heat from the exhaust gases from said expansion engine, then by abstraction of heat from the products of said oxidation, then compressing air for said oxidation by expanding said heated residual gases in the expansion engine and heating said compressed air prior to said oxidation by abstraction of residual heat from the products of combustion after the abstraction of heat therefrom by said residual gases.

4. The process of claim 3, in which the ammonia is mixed with said air prior to heating.

5. In the production of nitric acid under pressure by the oxidation of ammonia by air under pressure, absorption of the resulting oxides, and utilizing the residual gases to compress air for said combustion, the process which comprises heating the residual gases from said absorption, compressing a supply of air by said heated residual gases in alternate cycles in a common cylinder whereby the mean temperature of the combined cycles is low relatively to that of said heated residual gases.

TADEUSZ HOBLER.